Oct. 27, 1925.

A. C. WARD 1,559,513

BAT FORMING MACHINE

Filed Jan. 17, 1925  5 Sheets-Sheet 1

Inventor
A. C. Ward,

By Clarence A. O'Brien
Attorney

Oct. 27, 1925.

A. C. WARD 1,559,513

BAT FORMING MACHINE

Filed Jan. 17, 1925          5 Sheets-Sheet 2

Inventor
A. C. Ward
By Clarence A. O'Brien
Attorney

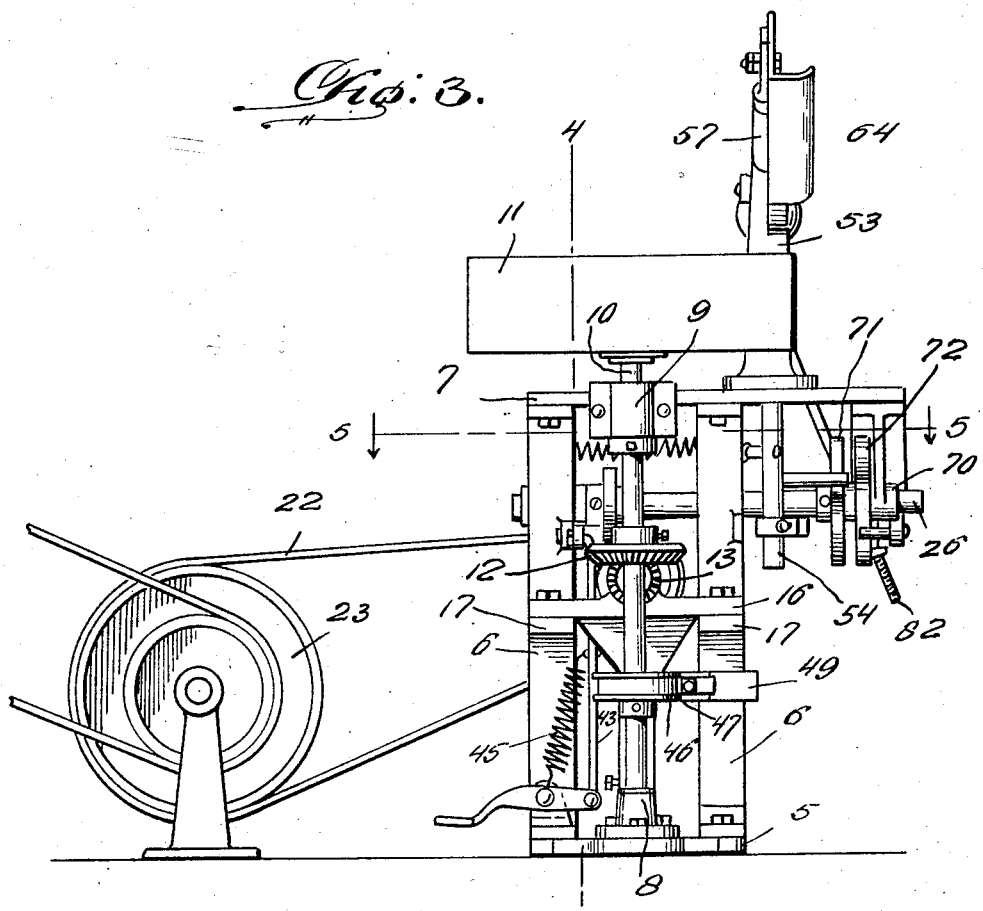

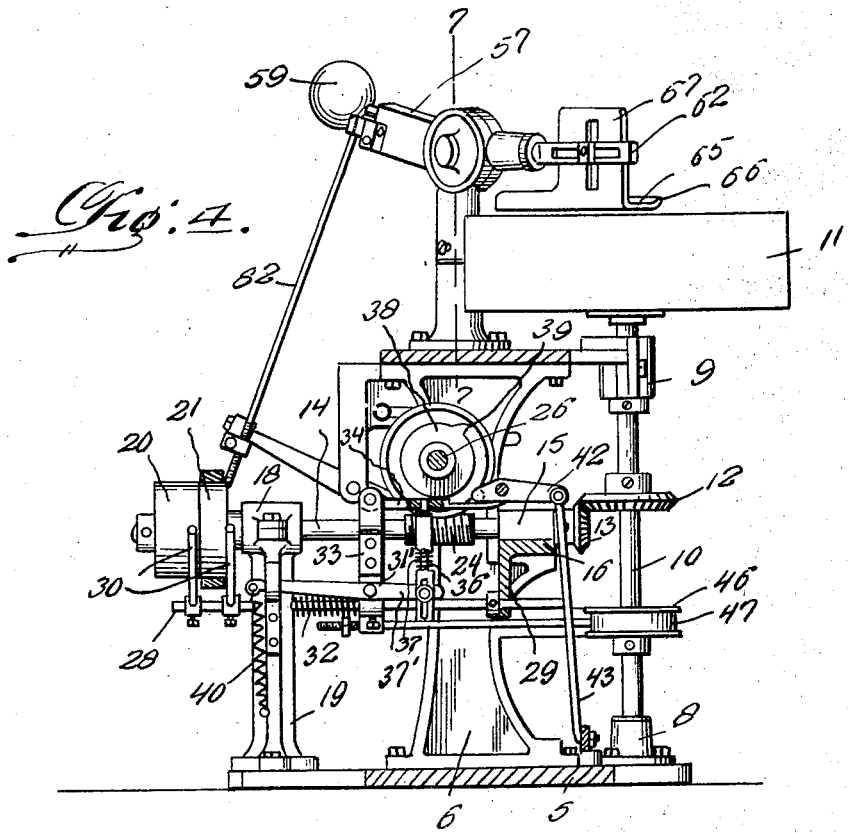

Oct. 27, 1925.                                1,559,513
                A. C. WARD
            BAT FORMING MACHINE
         Filed Jan. 17, 1925        5 Sheets-Sheet 5

Inventor
A. C. Ward,
By Clarence A. O'Brien
                  Attorney

Patented Oct. 27, 1925.

1,559,513

UNITED STATES PATENT OFFICE.

ALBERT C. WARD, OF CANONSBURG, PENNSYLVANIA, ASSIGNOR TO THE W. S. GEORGE POTTERY COMPANY, OF CANONSBURG, PENNSYLVANIA.

BAT-FORMING MACHINE.

Application filed January 17, 1925. Serial No. 3,144.

*To all whom it may concern:*

Be it known that I, ALBERT C. WARD, a citizen of the United States, residing at Canonsburg, in the county of Washington and State of Pennsylvania, have invented certain new and useful Improvements in Bat-Forming Machines, of which the following is a specification.

This invention relates generally to a machine for use in the pottery manufacturing industry, and has more particular reference to a machine for forming what is known in the trade as a bat, or in other words, for forming a mass of clay or other plastic material, into a strip or slab of uniform thickness, whereby the same may be readily worked over the article producing mold.

As far as I am aware, it has heretofore been necessary for skilled workmen to take a batch of clay and bat the same out by hand, in order to produce a uniform thickness of the clay. This requires great skill on the part of the workman, and considerable time is consumed in the formation of a single bat. It very frequently occurs that the workmen fail to work the batch into a bat of uniform thickness and the contraction and expansion of the resultant article will not be equal, and considerable breakage results.

It is therefore the primary object of my invention to provide a machine wherein bats may be automatically formed, and this without requiring the skilled workmen.

An additional object of the invention is to provide a machine of the foregoing character, that includes a high speed turn-table upon which the batch of clay is disposed, after which the operation of the machine will occasion the movement toward the bat of a spreader member that spreads the batch over the surface of the turn table for producing a bat of uniform thickness, the spreader member being automatically actuated to inoperative position after the batch has been satisfactorily worked, means being also provided for automatically cutting out the operation of the machine, immediately upon movement to an inoperative position, of the spreader blade.

A further object is to provide automatic means for breaking the rotation of the turn table simultaneously with the automatic movement of the spreader blade to inoperative position.

A further salient object is to provide a bat forming machine wherein the same is generally speaking, of simplified construction, and wherein the entire operation of the machine is under the control of but a single operator, and one that as above set forth may be employed by unskilled potters.

With the foregoing and other objects in view, as the nature of the invention will be better understood, the same comprises the novel form, combination, and arrangement of parts hereinafter more fully described, shown in the accompanying drawings, and claimed.

In the drawings, wherein like characters indicate corresponding parts throughout the several views:

Figure 3 is a front elevational view of the machine, the spreader blade being disclosed in the same position as shown in Figure 2.

Figure 4 is a detail vertical sectional view, taken substantially upon the line 4—4 of Figure 3, the spreader blade being shown as having been automatically moved to a position in slight spaced relation with respect to the turn table, which is the position of the spreader blade, just prior to the automatic movement of the same to inoperative position.

Figure 8 is a horizontal section of the spreader blade carrying arm per se.

Figure 9 is a perspective view of the member of the arm to which the spreader blade is directly adjustably attached.

Figure 10 is an enlarged perspective of the spreader blade per se.

Figure 12:
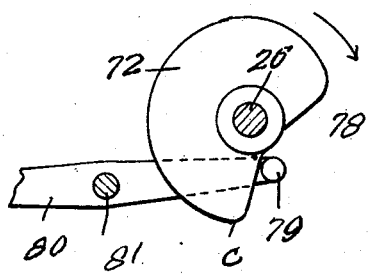
Figure 13:
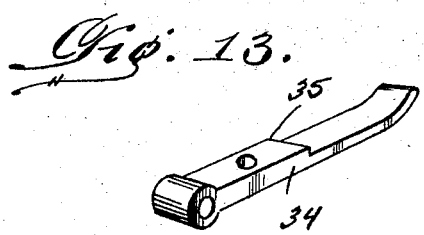

Figure 12 is a similar view, disclosing in side elevation a cam disc that automatically moves the spreader blade in a vertical direction downwardly toward the turn table, in a relatively slow manner, and Figure 13 is an enlarged perspective of an arm that is included in a unit of construction for moving a power belt to undriving position, and for operating a braking mechanism, for automatically stopping the rotation of the turn table simultaneously with the movement to undriving position of said belt.

Now having particular reference to the drawings, it will be seen that my novel bat forming machine constitutes the provision of a suitable base 5, secured to which and extending vertically therefrom in parallel spaced relation is a pair of standards 6—6, upon the upper end of which is a table or platform 7, one end of which extends considerably beyond the adjacent standard, as more clearly shown in Figure 3.

Figure 5:
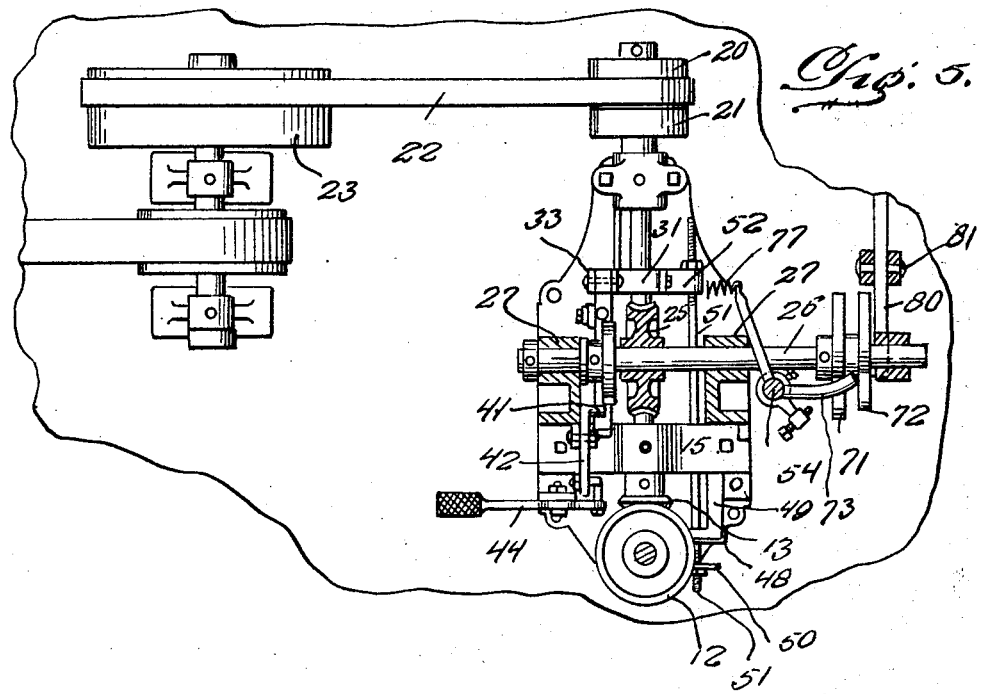
Figure 5 is a detail longitudinal section, taken substantially on the line 5—5 of Figure 3, and looking downwardly, in the direction of the arrow.

Journaled at its opposite ends in suitable bearings 8 and 9, secured to the base 5 and table or platform 7 is a vertical shaft 10, to the upper end of which is keyed a turn table 11, of circular formation, it being constructed preferably from a composition including plaster Paris. This vertical shaft 10 is equipped with a horizontally disposed bevelled gear 12, that has mesh with a relatively smaller bevelled gear 13, that is keyed upon the forward end of a horizontal shaft 14, suitably journaled at its forward end in a bearing 15 that is preferably formed integral with a cross bar 16, that is anchored at its opposite end to lugs 17—17 formed integrally upon the forward edges of the standards 6—6, Figure 3. The rear end of this horizontal shaft 14 is journaled within a bearing 18, carried by the upper end of a vertically disposed standard 19, that is suitably anchored at its lower end to the rear end of the machine base 5. Upon the inner end of the said horizontal shaft 14 there is loosely disposed a loose pulley 20, while inwardly thereof in relatively close engagement therewith is a narrower keyed pulley 21. For engagement over these pulleys there is provided a belt 22, that is, in turn, trained over a relatively larger pulley 23, in alignment with the pulley 21, which is operated through the medium of a suitable source of power, not shown. Between the standards 6—6 of the machine, said horizontal shaft 14 is equipped or formed with the worm 24, that intermeshes with a vertically disposed worm gear 25, that is keyed to a shaft 26, that extends at right angles to the horizontal shaft 14. This shaft, as more clearly disclosed in the detail sectional view, Figure 5, is journaled in bearings 27—27 formed or otherwise associated with the standards 6—6.

As far as the description has progressed, it will be apparent that when the belt 22 is trained over the keyed pulley 21, as in Figure 4, a rotation will be imparted to the shaft 14. This rotation of the shaft will consequently occasion a rotation of the vertical shaft 10, upon the upper end of which is disposed the turn table 11. The rotation of the shaft 14 will also occasion a rotation of the right angularly disposed shaft 26 for a purpose hereinafter more fully described. Means is provided for automatically moving the belt 22 from the key pulley 21, to the loose pulley 20, after a predetermined operation of the machine. This means comprises a rod 28, that is disposed for horizontal sliding movement through an opening in the bearing standard 19, and through an aligned opening in a lug 29, formed integral with and pendent from the cross bar 16, which carries the foremost bearing 15, for the right angularly disposed shaft 14, Figure 4. The rearmost end of this rod 28 carries a pair of adjustably vertically extending pins 30—30, that engage over opposite edges of the belt 22. This rod 28 carries, at a point inwardly of the vertical bearing standard 19 a vertically disposed block 31, that is formed at its upper end with an opening, through which extends the shaft 14, whereby a guide is provided for this slot, during the reverse movement of the same. The rod 28 is normally forced forwardly through the medium of an expansible coil spring 32, that surrounds the rod intermediate the bearing standard 19 and the block 3. This forward position of the rod maintains the belt 22 in engagement over the keyed pulley 21. Secured to the before-mentioned block 31 at the upper end thereof, and at one side of the same, is a vertical yoke member 33, between the arms of which is pivoted one end of a forwardly extending rock arm 34, shown in detail in Figure 13. Intermediate the ends of the rocker arm 34, the upper surface thereof is formed with a shoulder 35, and this arm is normally forced upwardly upon its pivot, through the medium of an expansible coil spring 36, that surrounds an elongated pin 37, the upper end of which loosely extends through an opening in the rocker arm 34, and the lower end of which is rigidly connected to a rock lever 37' pivoted to the before-mentioned block 31', carried by a belt shifting rod 28.

The worm gear carrying shaft 26 has keyed thereto, at a point adjacent said worm gear and above the rocker arm 34, a disc 38 that is formed on its periphery with a lug 39, that at each rotation of the shaft 26, engages the shoulder 35 of the rocker arm, and occasions through the medium of the connecting block 31, a rearward movement of the rod 28, which will obviously force the belt 22 upon the loose pulley 21, at which time the operation of the machine will cease.

For assisting the spring 36 in swinging the rocker arm 34 upwardly into engagement with the disc 38, the rock lever 37' has secured to its outer end, one end of a retractile coil spring 40, the other end of which is anchored to the bearing standard 19, Figure 4. To the opposite end of this rock lever is secured the lower end of the before-mentioned elongated pin 37.

The forward end of the rocker arm 34 is bent slightly upwardly, as more clearly shown in Figure 13, and for engagement therewith after the same has been moved rearwardly by the action of the lug 39, carried by the disc, is a pin 41, carried by the inner end of a rocking link 42, pivotally secured to the adjacent standard 6. The outer end of this rocking link is connected, pivotally, to the upper end of a rod 43, that is, in turn, pivotally connected at its lower end to a foot pedal control lever 44, pivoted to the base of the machine. The rod 43 is normally pulled downwardly for maintaining the pin 41 out of engagement with the rocker arm 34, through the medium of a retractile coil spring 45, anchored at one end to the rod and at the opposite end to the foot controlled lever 44.

It will be obvious that after the rocker arm 34 has been moved rearwardly by the action of the lug 39, which movement will actuate the belt shifting rod 28, the forwardly upwardly bent end of the rocker arm will be at a position directly beneath the pin 41, of the rocking link. A deflation of the foot lever will force the rod 43 upwardly, for consequently rocking the link, which movement will occasion the depression of the rock arm, for disengaging the shoulder 34 thereof from the lug 39 of the disc 38. The spring 32, surrounding the shifting rod 28 will obviously move this shifting rod into forward position for again moving the belt 22 into position upon the keyed pulley 21, at which time the machine will again begin to operate.

Figure 6:
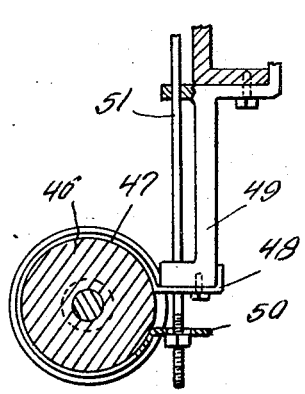
Figure 6 is an enlarged fragmentary horizontal section, through a certain portion of the machine, for disclosing more clearly the automatic bracing mechanism for the turn table.

So that the operation of the turn table 11 will be automatically positively stopped at the time the pulley 22 is moved onto the loose pulley 20, the vertical shaft 10 is equipped with the brake drum 46, at a point beneath the bevelled gear 12. Surrounding this brake drum is a brake band 47, one end 48 of which is anchored, to the forward end of a bar 49, that is, itself, anchored to the adjacent standard 6 of the apparatus, Figure 6. The other end 50 of the brake band is adjustably connected to the forward end of a rod 51, that extends rearwardly through suitable guides and is connected, to the block 31, through the medium of a suitable connection 52, Figure 5. Obviously, as the belt shifting rod 28 moves rearwardly, the brake rod 51 will also move rearwardly, for contracting the brake band 47, upon the brake drum 46.

Reference will now be made to the batch spreader blade and its operating mechanism. Disposed upon the platform 7, at one side of the turn table 11 is a bearing standard 53, through which extends the upper reduced end of a post 54, said platform being provided with an enlarged circular opening 7', for this purpose.

Figure 1:
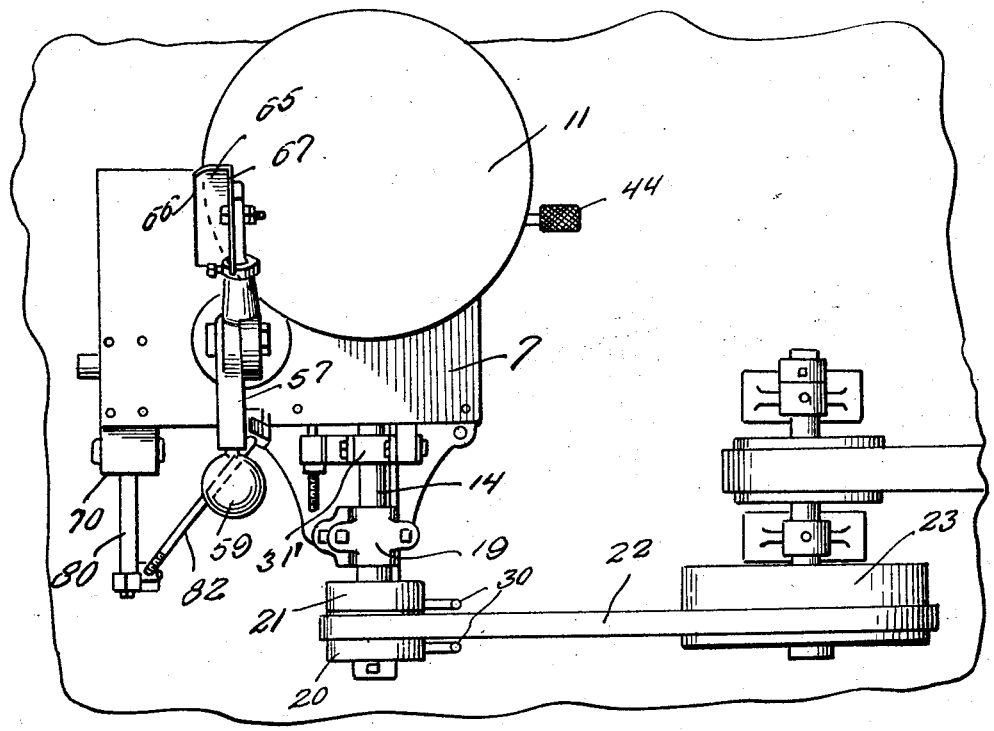
Figure 1 is a top plan view of a bat forming machine, constructed in accordance with the present invention.
Figure 2:
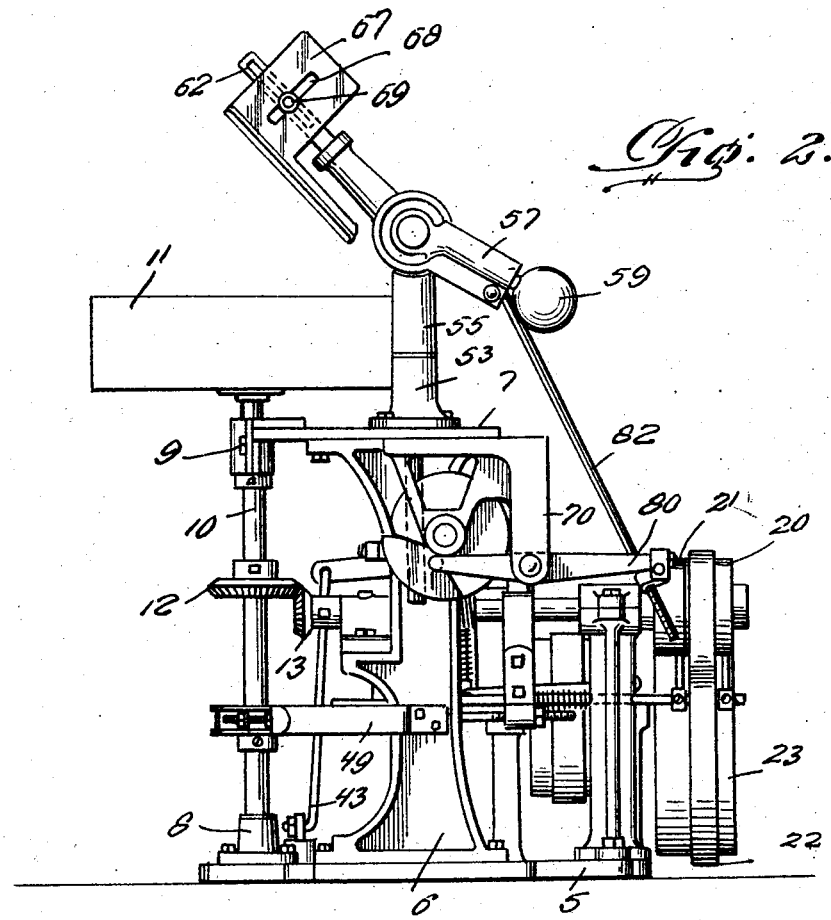
Figure 2 is a side elevational view thereof, the spreader blade being shown as raised to inoperative position.

Adjustably secured to the upper end of the post 54, that projects through the bearings 53, is a post 55, through the upper end of which is pivoted, as at 56, an arm 57, the rear end of which is weighted, as at 59, for normally maintaining the arm in the raised position shown in Figures 1, 2, and 3. The forward end of this arm is socketed as at 60, for receiving the headed end 61, of a flat and slotted pin 62. This headed end of the pin is maintained within the socket of the arm, through the medium of a set screw 63. The spreader blade, per se, which is more clearly shown in Figure 10, is designated generally 64 and comprises an elongated metallic strip 65, for positioning in substantially parallel relation with respect to the arm 57, as more clearly shown in Figures 2 and 4. The outer edge of this strip is curved slightly upwardly, as at 66, in order that the edge thereof will not effect a scraping action upon the batch of clay being worked. The lower end of the spreader blade is formed with a vertical ear 67 that is provided with a vertical slot 68 for registration with the slot in the slotted pin 62 and whereby the blade may be adjustably secured to the pin through the medium of a bolt and nut connection 69.

Figure 11:
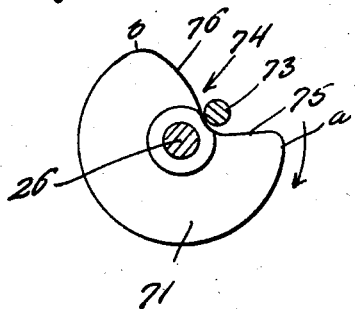
Figure 11 is a sectional view through a certain operating shaft of the machine for disclosing in side elevation a cam disc, whereby the spreader blade is automatically moved slowly from inoperative to operative position with respect to the turn table, during the operation of the machine.
Figure 7:
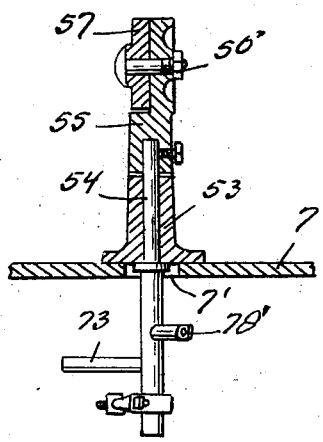
Figure 7 is a fragmentary vertical section, taken substantially upon the line 7—7 of Figure 4, for more clearly disclosing the pivotal supporting means for the spreader blade carrying structure.

The right hand end of the horizontal shaft 26 extends through the bearing in the adjacent standard 6, and is journaled in a suitable shaft hanger 70 that is secured to and pendent from the platform 7. Inwardly of this hanger 70 there is keyed to the shaft 26 a pair of spaced cam discs designated 71 and 72 respectively. Having close engagement with the periphery of the cam 71 is a lateral pin 73 that is formed upon the beforementioned post 54, and extending at right angles thereto as more clearly shown in Figures 5 and 7. The shaft 26 is disposed through the exact center of this cam 71 as is clearly shown in Figure 11. The periphery of this disc 71 is formed with a peculiarly shaped cut-out portion 74 the point 75 of which is at direct right angles to the shaft 26. The inner end of this point terminating directly adjacent the shaft. The edge of this cut-out 74 then extends upwardly, in tangential arrangement with the shaft 26. The edge of this portion which is designated 76 is slightly curved. The cam 71 rotates in the direction of the arrow in Figure 11, and it will be obvious that when the pin 73 is in the position shown in this figure, the rotation of the cam will force the same outwardly for rotating the post 54, and consequently swinging the spreader blade carrying arm 57 horizontally inwardly toward the turn table 11. The pin 73 is maintained in such a position as to hold the spreader blade carrying arm at a point directly above the turntable as shown in Figure 4, by the engagement of the pin upon the periphery of the cam 71 between the points a and b of the cam. The continued rotation of the disc will permit the post 54 to quickly rotate in a reverse direction for swinging the blade carrying arm away from the turn table, due to the fact that as the point a of the disc reaches the pin 73, the same will quickly move inwardly toward the shaft 26 due to the presence of a retractile coil spring 77, that is anchored at one end to a rearwardly directed pin 78' carried by the post 54, and at its opposite end to the foremost standard 6.

The other disc 72 is mounted slightly off center upon the shaft 26 as shown in Figure 12, and the periphery of this disc is formed with a relatively wide V-shaped cut-out 78. For engagement with the periphery of this disc is a pin 79 carried by the forward end of a rocking lever 80 that is pivotally secured as at 81, to the hanger 70 for the projecting end of the shaft 26. The rearmost end of this rocking lever 80 is adjustably connected to the rearmost end of the spreader blade carrying arm 57, through the medium of a connecting rod 82. As this cam 72 rotates in the direction of the arrow in Figure 12, one edge of the cut-out 78 will engage the pin 79, for obviously rocking the lever 80 upon its pivot, for swinging the spreader blade carrying arm vertically downwardly, in a relatively slow manner. The cam surface of the disc 72 will move the blade carrying arm still further downwardly, in a much slower manner for bringing the spreader blade 64 into engagement with the batch of material upon the turn table, and insomuch as the arm 57 is moving inwardly at the time it is moving downwardly, due to the position of the cams with respect to each other, the batch of clay upon the turn table will be effectively spread across substantially the entire area thereof, it being well to know that the forward edge of the blade terminates at approximately the dead center of the turn table, whereby the entire batch is worked upon. The angle of the blade, with respect to the turn table may be varied, as may also the downward swinging movement of the blade carrying arms due to the adjustable connection 82, between the rocking lever 80 and the blade carrying arm. The connections between the ends of the rod 82 and the blade carrying arm 57 and the rocking lever 80 are of a pivotal nature, in order that the blade carrying arm may be moved inwardly simultaneously with the downward movement thereof. At the time the point c of the cam 72 reaches the pin 79 of the rocking lever 80, the arm 57 will quickly raise to the position shown in Figure 3, due to the presence of the weight 59 upon the rear end thereof.

It will thus be seen that by depressing the foot pedal lever 44 the machine will be brought into operation and as soon as the machine begins to operate, the spreader blade carrying arm will quickly move inwardly toward the turn table and then slowly downwardly, in order that the blade will spread the batch across the surface of the turn table for producing the bat which after the machine automatically ceases operating, may be removed by the operator, and a new batch of clay disposed upon the table.

It is believed that from the foregoing description when considered in conjunction with the drawings, the complete operation of the machine will be readily apparent to those skilled in the art, and even though I have herein shown and described certain detail elements as comprising the bat forming machine, it is nevertheless to be understood that departures may be had from the specific structural elements without departing from the spirit and scope of the appended claims.

Having thus described my invention, what is claimed is:

1. In a bat forming machine of the character described, a turn table, a spreader blade, means for rotating the turn table, means for moving the spreader blade slowly inwardly toward and slowly downwardly toward the central point of the turntable during the rotation of the same, means for automatically quickly raising the spreader blade from the material, and additional means for moving the spreader blade longitudinally to one side of the turn table.

2. In a bat forming machine of the character described, a turn table, a spreader blade, means for rotating the turn table, means for moving the spreader blade slowly inwardly toward and slowly downwardly toward the central point of the turntable during the rotation of the same, means for automatically quickly raising the spreader blade from the material, additional means for moving the spreader blade longitudinally to one side of the turn table, and automatic means for cutting out the operation of the machine after a predetermined number of revolutions of the turn table.

3. In a bat forming machine of the character described, a turn table, a spreader blade, means for rotating the turn table, means for moving the spreader blade slowly inwardly toward and slowly downwardly toward the central point of the turntable during the rotation of the same, means for automatically quickly raising the spreader blade from the material, additional means for moving the spreader blade longitudinally to one side of the turn table, automatic means for cutting out the operation of the machine after a predetermined number of revolutions of the turn table, and automatic means for preventing further rotation of the turn table at the time of cutting out the operation of the machine.

4. In a bat forming machine of the character described, a turn-table, a spreader blade, means for rotating the turn table, means for moving the spreader blade into operative association with material on the turntable during the rotation of said turn table, means for raising the spreader blade from the material, and additional means for moving the spreader blade longitudinally to one side of the turn table.

5. In a bat forming machine of the character described, a turn table, a spreader blade, means for rotating the turn table, means for moving the spreader blade into active association with the material on the turn table to evenly spread the same thereon, means for automatically raising the spreader blade from the material, additional means for moving the spreader blade longitudinally to one side of the turn tables, and automatic means for cutting out the operation of the machine after a predetermined number of revolutions of the turn table.

6. In a bat forming machine of the character described, a turn table, a spreader blade, means for rotating the turn table, means for moving the spreader blade slowly inwardly toward and slowly downwardly toward the center points of the turn table during the rotation of the same, means for automatically quickly raising the spreader blade from the material, and automatic means for cutting out the operation of the machine after a predetermined number of revolutions of the turn table.

7. In a bat forming machine of the character described, a turn table, a spreader blade, means for rotating the turn table, means for moving the spreader blade slowly inwardly toward and slowly downwardly toward the center points of the turn table during the rotation of the same, means for automatically quickly raising the spreader blade from the material, automatic means for cutting out the operation of the machine after a predetermined number of revolutions of the turn table, and automatic means for preventing further rotation of the turn table at the time of cutting out the operation of the machine.

8. In a bat forming machine of the character described, a turn table, a spreader blade, means for rotating the turn table, means for moving the spreader blade slowly inwardly toward and slowly downwardly toward the center points of the turn table during the rotation of the same, means for automatically quickly raising the spreader blade from the material, and automatic means for preventing further rotation of the turn table after the completion of the operation of the machine.

In testimony whereof I affix my signature.

ALBERT C. WARD.